United States Patent [19]
Brewster

[11] Patent Number: 5,368,703
[45] Date of Patent: Nov. 29, 1994

[54] METHOD FOR ARSENIC REMOVAL FROM WASTEWATER

[75] Inventor: Michael D. Brewster, Tonawanda, N.Y.

[73] Assignee: Anco Environmental Processes, Inc., Amherst, N.Y.

[21] Appl. No.: 881,972

[22] Filed: May 12, 1992

[51] Int. Cl.⁵ ............................... C02F 1/461
[52] U.S. Cl. ........................ 204/86; 204/149
[58] Field of Search ............ 204/149, 112, 86

[56] References Cited

U.S. PATENT DOCUMENTS

| | | | |
|---|---|---|---|
| 3,656,940 | 4/1972 | Gandon et al. | 204/113 |
| 4,163,716 | 8/1979 | Turnbull | 210/28 |
| 4,490,257 | 12/1984 | Becker | 210/610 |
| 4,566,975 | 1/1986 | Allgulin | 210/711 |
| 4,622,149 | 11/1986 | Devuyst et al. | 210/717 |
| 4,880,510 | 11/1989 | Uhrich | 204/131 |
| 5,000,859 | 3/1991 | Suciu et al. | 210/713 |
| 5,013,453 | 5/1991 | Walker | 210/712 |
| 5,024,769 | 6/1991 | Gallup | 210/721 |
| 5,043,080 | 8/1991 | Cater et al. | 210/748 |
| 5,051,187 | 9/1991 | Matsumoto et al. | 210/639 |
| 5,093,007 | 3/1992 | Domvile | 210/713 |
| 5,100,639 | 3/1992 | Freire et al. | 423/484 |

*Primary Examiner*—John Niebling
*Assistant Examiner*—Arun S. Phasge
*Attorney, Agent, or Firm*—Lowe, Price, LeBlanc & Becker

[57] ABSTRACT

A process and apparatus for removing arsenic from aqueous media is described. The process in general utilizes ferrous ion provided by an electrochemical cell which is added to the aqueous media in a first step, followed by mild oxidizing conditions generated by the addition of hydrogen peroxide. The ferrous ion then forms an hydroxide which is oxidized to an oxyferric oxide and the arsenic present at a +3 oxidation state is oxidized to a +5 state whereupon the oxyacid complexes with the oxyferric oxide. A precipitate then is formed which consists of ferric arsenate, and the hydroxy ferric oxide-oxyacid complex. Heavy metals may also be removed by the process.

7 Claims, 3 Drawing Sheets

METHOD FOR ARSENIC REMOVAL FROM WASTEWATER

CROSS REFERENCE TO RELATED APPLICATIONS

This application is related to U.S. patent application Ser. No. 07/610,653 filed Nov. 8, 1990 now abandoned, which in turn was a continuation-in-part of patent application Ser. No. 07/435,909, filed Nov. 13, 1989 now abandoned, which in turn was a continuation of U.S. patent application Ser. No. 07/293,594, filed Jan. 5, 1989, now U.S. Pat. No. 4,880,510, issued Nov. 14, 1989, which in turn was a continuation of application Ser. No. 156,438, filed Feb. 16, 1988, and now abandoned, which in turn was a continuation of application Ser. No. 063,533, filed Jun. 18, 1987, now also abandoned.

BACKGROUND OF THE INVENTION

This invention relates to a process for removing arsenic containing compounds from wastewater, groundwater, and the like wherein said compounds are normally present in a soluble or dissolved form. Incidental thereto, the process of this invention also is capable of removing certain heavy metals associated with such wastewater or groundwater streams.

In recent years, emphasis on discharging clean water into rivers, bays, and the like has increased dramatically. Discharge of industrial wastewater containing toxic substances has in some areas polluted groundwater or surface water to an extent forcing the intervention of federal and state instrumentalities. Efforts to clean up the environment relative to such discharges after the fact have met with uncertain success. It is, therefore, desirable to prevent such discharges by treating the industrial wastewater at the source before discharging and also to provide for the treatment of groundwater and the like to remove such contaminants.

It has been known that certain heavy metals, such as chromium, which are normally present in wastewater in soluble form can be readily precipitated and removed from the wastewater flow. In U.S. Pat. Nos. 3,926,754; 4,036,726; and 4,123,339, assigned to the assignee of this invention, heavy metals such as hexavalent chromium ions were effectively removed from cooling tower wastewater electrochemically. The disclosures of these patent are hereby incorporated by reference.

In the above patents, a process and apparatus were described wherein wastewater containing hexavalent chromium ions is caused to flow between a plurality of electrodes. It was discovered that when the anode has a surface or a portion of the surface of iron, an iron alloy or insoluble iron compound, an iron hydroxide derivative will be produced electrochemically. In turn, an insoluble trivalent chromium compound, preferably as the hydroxide will be produced which will complex with or otherwise physically or chemically combine with the insoluble iron derivative to thereby permit removal from solution. Whereas it was previously considered necessary to reduce hexavalent chromium to trivalent chromium in acidic solution, it was discovered that the iron compound or complex formed will reduce the hexavalent chromium and coprecipitate therewith in a solution having a pH of about 4 to about 11. Accordingly, the invention described and claimed in said patents produces an insoluble iron-chromium precipitate without pH adjustment to thereby rapidly and efficiently remove hexavalent chromium from solution. The precipitate is then removed from aqueous media utilizing conventional techniques such as a clarifier, settling pond or the like and the aqueous media thereby clarified is suitable for disposal.

In this process, hexavalent chromium undergoes cathodic reduction to form trivalent chromium as insoluble chromic hydroxide which complexes with iron entering solution at the anode. The products are not susceptible to further electrolytic oxidation at the anode, back to hexavalent chromium, apparently due to the difference in ionization potential at least in part because the production of the hydroxide ion at the cathode occurs at a much lower potential than other electrode reactions. Thus, because of the nonamphoteric state of the iron complex, the reaction continues until the undesirable contaminating ions are completely or substantially removed from solution in the aqueous media.

It was also discovered in U.S. Pat. No. 4,880,510, also assigned to the assignee of this invention, that the electrolytic cell and process could be used to remove color impurities such as dyes from wastewater solution. The ferrous iron generated at the anode reacts with hydroxide ion to form an iron complex or compound which further was found to react with or otherwise remove the color bodies from aqueous media as an insoluble precipitate therewith. Accordingly, the disclosure of U.S. Pat. No. 4,880,510 is also incorporated by reference herein.

Therefore, broadly speaking, soluble metals which require chemical reduction such as from hexavalent to trivalent chromium in order to form insoluble species could be removed by the iron specie generated electrochemically as a coprecipitate or complex therewith. Color bodies similarly reacted to form coprecipitates or at least complexes with the insoluble iron specie generated in the electrochemical cell so that the insoluble complex or combination could be removed from solution using conventional techniques such as flocculation, filtering, a settling pond, or the like. Contaminants in wastewater or groundwater, however, may include a number of heavy metals in addition to chromium which require oxidation in order to form insoluble species or which for a variety of reasons are not readily removable from solution by the electrochemical generation of an iron compound or specie under neutral or slightly basic conditions.

In U.S. Pat. No. 5,013,453, heavy metals are removed from solution using an alkali precipitation technique carried out at a pH of between 9 and 12. The invention uses coprecipitation with ferrous ions added to solution to reduce the heavy metal content below equilibrium concentrations. The ferrous ions are added and then oxidized to ferric at a pH maintained by the addition of a base such as ammonia. Ferrous salts are added to solution to supply the ferrous ion and aqueous ammonia is preferred to be used as an additive to supply hydroxyl ions.

In U.S. Pat. No. 4,566,975, heavy metals such as arsenic are removed in a two step process which involves an alkaline precipitation carried out at a pH of at least about 8 and using ferrous sulfate as an additive.

In U.S. Pat. No. 4,490,257, contaminants are removed from a paper pulping operation using electrolysis with plate electrodes. The electrodes, however, are extremely resistant to corrosion in that chlorine and chlorides are released at the cathode. In U.S. Pat. No. 5,043,080, contaminated groundwaters are treated with hydrogen peroxide and transition metal ions at an acid pH in the presence of ultraviolet light. The main object, however, is the removal of organic contaminants rather than heavy metals.

Also, in U.S. Pat. No. 4,163,716, it was recognized that heavy metals and color bodies from dye house affluent could be removed with ferrous ions supplied by iron electrodes with the ferrous ion oxidizing to the ferric state by use of an oxidizing agent such as hydrogen peroxide. At a pH of between 7 and 9, heavy metals and traces of color adhere to the ferric hydroxide floc which then may be removed. This process also involves a pH adjustment from a reaction pH of below 6.5 to a pH of from 7 to 9 to achieve removal of color particles.

Accordingly, it remains an object to provide a process from the removal of a wide variety of heavy metals and other contaminants from wastewater and groundwater.

SUMMARY OF THE INVENTION

It has been discovered that an electrolytic cell using a cathode and an anode and a plurality of closely spaced individual plate electrodes disposed therebetween wherein the anode and anode surfaces of the additional electrodes are at least iron, an iron containing alloy coated therewith so that ferrous ion will be generated anodically in aqueous solution. The ferrous ion produces an hydroxy ferrous derivative the structure of which is not totally known.

However, it has been discovered that when the output from the electrolytic cell is oxidized in mild oxidizing conditions, an hydroxy ferric oxide will be produced and the arsenic normally present as soluble arsenite will be oxidized to arsenate and thereby precipitated from solution with the hydroxy ferric oxide as an insoluble precipitate. Incidentally, heavy metals present such as manganese will also be oxidized and precipitate. Moreover, the process of this invention permits removal of arsenic from groundwater or wastewater down to a level well below that generally regarded as safe due to the formation of a surface complex with the hydrous ferric oxide as well as electrostatic attraction. This "adsorption" occurs in addition to the normally expected removal mechanism by the formation of the precipitate ferric arsenate and accounts for removal of arsenic from solution down to concentrations well below those regarded as safe.

Accordingly, oxidation of the output stream from the electrolytic cell then results in removal of arsenic from solution as well as a number of other heavy metals, which removal occurs in conjunction with reactions normally expected between, for example, ferrous ion generated in the electrolytic cell and contaminate ions which can be reduced thereby such as hexavalent chromium.

Accordingly, it is an object of this invention to provide a process for the removal of arsenic from solution down to levels well below that regarded as safe in a two step process wherein the water containing the arsenic passes through an electrolytic cell and then a mild oxidation to form a precipitate which can be removed from solution by conventional procedures such as flocculation and clarification.

It is another object of this invention to provide a process whereby ferrous ion is generated electrolytically in a wastewater stream and subsequently oxidized to ferric whereby an hydrous ferric oxide constitute is formed which will react with arsenic in solution after the same has been oxidized to the arsenate specie to form insoluble ferric arsenate, and a complex of hydrous ferric oxide and arsenic acid.

It is yet another object of this invention to provide a process for removal of arsenic from aqueous media in which the media is supplied with ferrous ion electrolytically generated and the mixture is then oxidized with hydrogen peroxide in a sufficient quantity to oxidize the ferrous ion to ferric and the arsenic specie from +3 to +5 whereby it is present primarily as the oxyacid arsenic acid, with the mixture then being clarified at a pH of around 6.5 to effect adsorption of the arsenic as insoluble ferric arsenate, and a complex formed of hydrous ferric oxide with arsenic acid for removal from the system as a precipitate.

These and other objects will become readily apparent with reference to the drawings and following description wherein:

DETAILED DESCRIPTION OF THE INVENTION

As is well known, arsenic at the +3 state in aqueous condition forms arsenite species which are generally soluble. In contrast, arsenic at the +5 oxidation state forms arsenate species which are less soluble. In the presence of ferric ion, ferric arsenate is formed and in the presence of anhydrous ferric oxide ((FeO)(OH)) at least one proton will be transferred to the hydroxyl group to form an insoluble complex according to the following reactions:

$$H_3AsO_4 + FeO(OH) \rightarrow FeOH_2AsO_4 + H_2O$$

$$H_3AsO_4 + 2FeO(OH) \rightarrow (FeO)_2HAsO_4 + 2H_2O$$

$$H_3AsO_4 + 3FeO(OH) \rightarrow (FeO)_3AsO_4 + 3H_2O$$

The more protons on the arsenic acid, the greater the potential for surface complexation on the hydrous ferric oxide. As a result, surface complexation is favored by lower pHs. The equations shown above represent a simplification of the complexation reactions. Since the actual structure of hydrous ferric oxide is not well documented and changes in relation to stream parameter, it is not known with certainty, but it is believed that the above equations explain why an elevated iron/arsenic weight ratio, preferably in the 4 to 5:1 area is needed to reduce effluent arsenic concentrations to a minimum level of, for example, below 0.005 mg/l.

In addition to the formation of ferric arsenate and the surface complexes, it is also possible to remove remaining arsenic oxyanions by simple electrostatic attractions. Hydrous ferric oxide in combination with various surface complexes contains areas of apparent positive and negative charges. Opposite charges attract and are strong enough to remove some dissolved ions from the effluent stream.

Wastewater treatment then to remove arsenic involves adsorption, coprecipitation, surface complexation, and electrostatic attraction. Frequently, the processes overlap and distinction becomes difficult. In general, however, the process of this invention utilizes solids formation, surface complexation and electrostatics attraction to remove arsenic contaminants and other heavy metals, as will be subsequently described, from solution.

Arsenic will lose electrons to be in the +3 or +5 state though in aqueous solution it exists tightly bound to oxygen which results in an anionic form. See Table I below for a comparison with phosphorus. Arsenic's anionic form is an oxyacid. In the +5 or pentavalent state, the forms are $AsO_4^{-3}$, $HAsO_4^{-2}$ and $H_2AsO_4^{-1}$. These forms predominate in oxygen rich water where mild oxidizing conditions are present, and are commonly referred to as arsenate species. The other principal aqueous form of inorganic arsenic is arsenite or the +3 state. Under moderate reducing conditions which are common for ground water, the trivalent state will predominate. Just as for arsenate, the pH will determine which arsenite anion will be prevalent. Arsenite species include $As(OH)_3$ $As(OH)_4^{-1}$, $AsO_2OH^{-2}$, and $AsO_3^{-3}$. There are other less common forms which are not important relative to the instant situation.

TABLE I

| $H_3PO_4$ | $H_3AsO_4$ | $H_3AsO_3$ |
|---|---|---|
| 2.1 | 2.2 | 9.22 |
| 7.2 | 6.98 | 12.13 |
| 12.3 | 11.55 | 13.4 | pK VALUES at 25° C.

Figure 1:
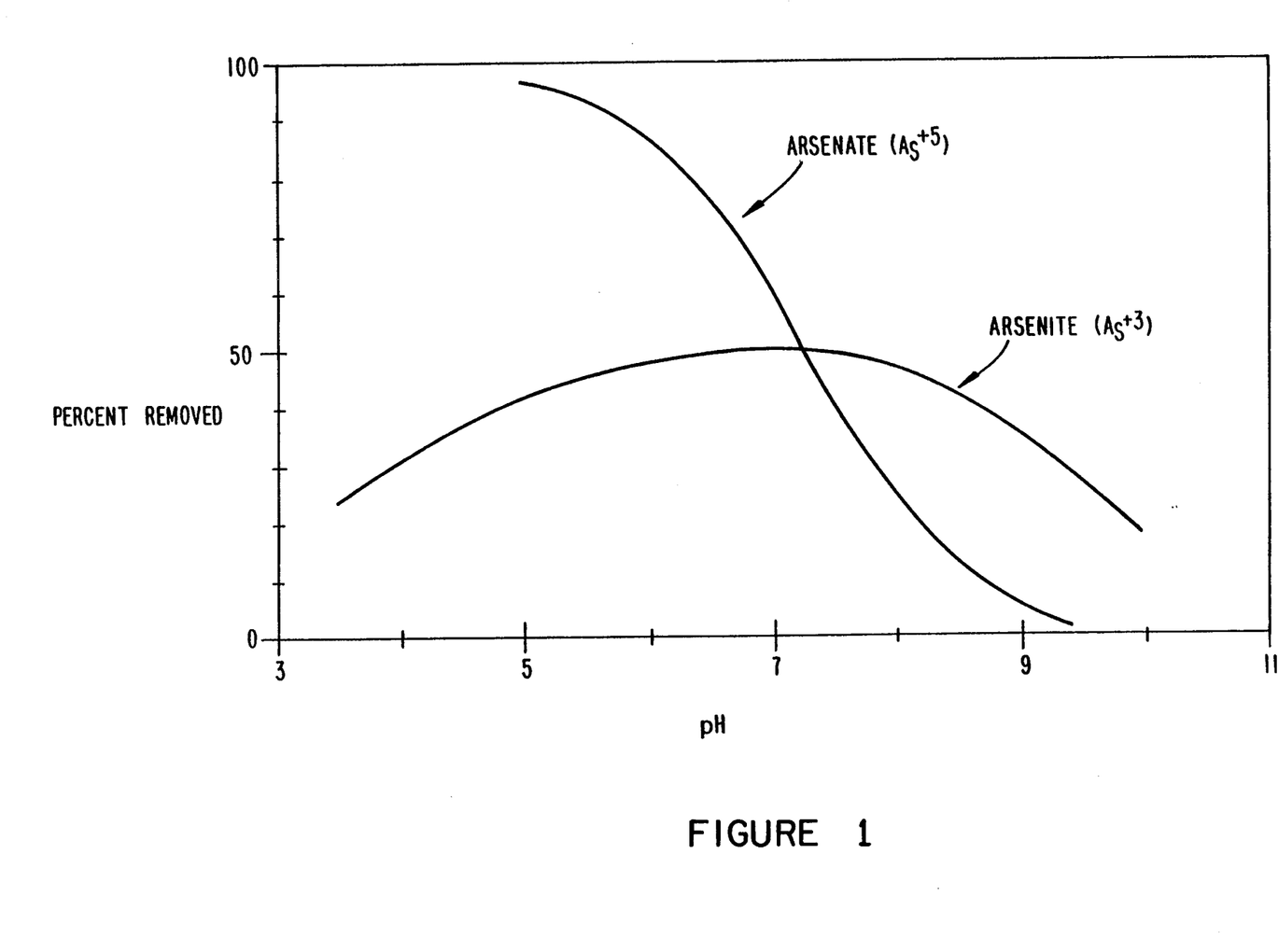
FIG. 1 is a graph representing the adsorption of arsenate and arsenite wherein the percentage removed is depicted against the pH.

With attention to FIG. 1, there is shown therein a typical adsorption curve for arsenate and for arsenite. In the pentavalent state, achievable arsenic removal is approximately 50% greater for arsenate than for arsenite. Two explanations account for the improved removal efficiency. First ferric arsenate is less soluble than ferric arsenite. The second reason refers to their respective disassociation constants. Arsenious acid ($As^{+3}$) does not readily lose its protons. This reduces the potential for surface complexations and causes removal to rely almost entirely upon electrostatic attraction. The association constants combine with the ability to form surface complexes are important when considering adsorption curve maximums, minimums, and shape.

Figure 2:
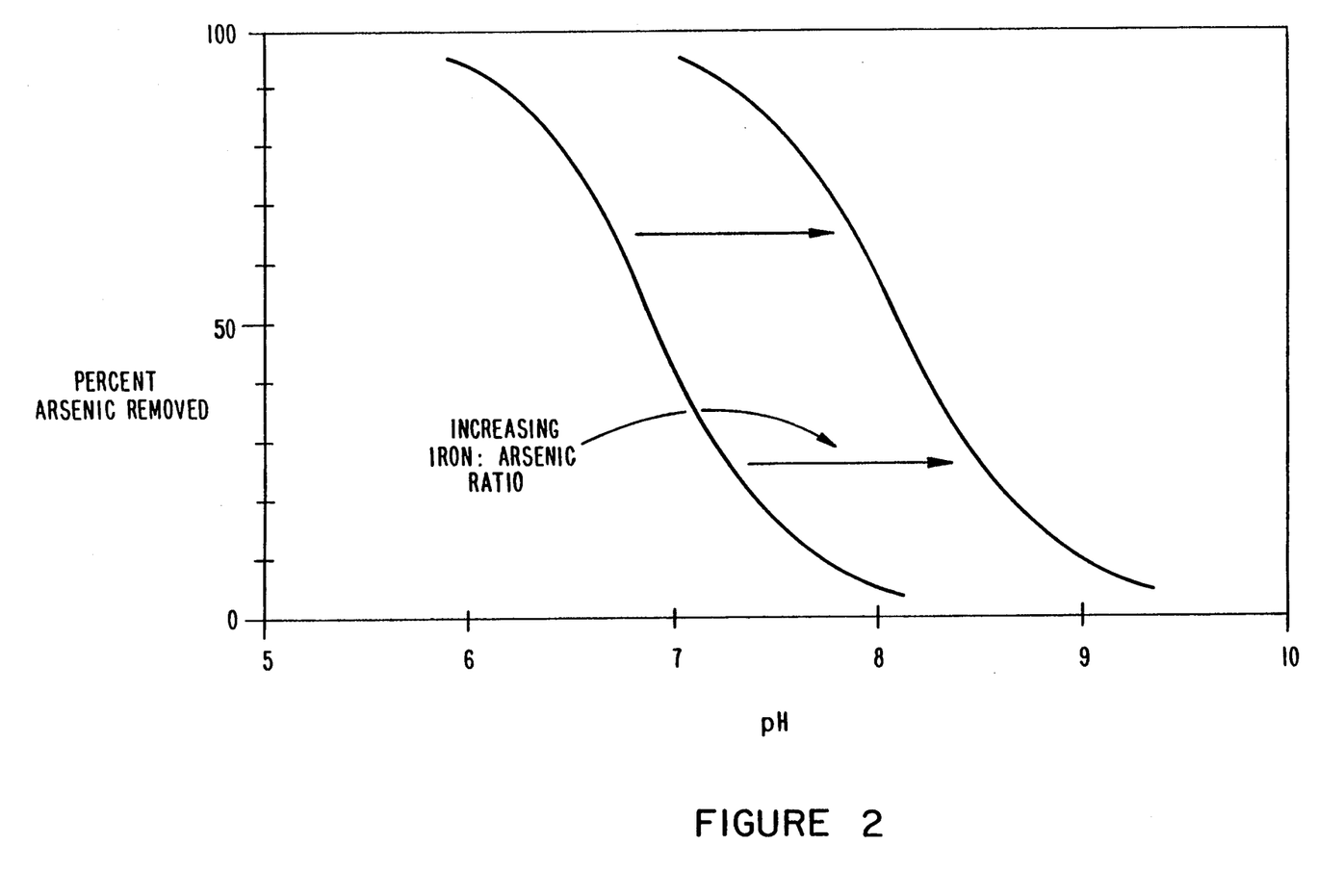
FIG. 2 is a graph illustrating the percentage of arsenic removal at different pH levels for an increasing iron:arsenic ratio.

As pH is increased, protons are removed from the complex oxyanions ($H_2AsO_4^{-1} \rightarrow HAsO_4^{-2} \rightarrow AsO_4^{-3}$). At elevated pHs, all protons disassociate from the arsenate ion. The ability to react with the hydrous ferric oxide by displacing a hydroxyl group is reduced. At this point, removal by electrostatic attraction predominates. This describes why the iron:arsenic ratio must be increased if a higher pH is desired and/or required as shown in FIG. 2. Accordingly, the optimum iron ratio is 4 or 5 to 1 at a neutral pH. If it is desired to utilize a higher pH for clarification, then the iron ratio to arsenic will have to be increased as shown in FIG. 2. The higher pH would be necessitated by the desire to remove heavy metals in addition to the arsenic.

Figure 3:
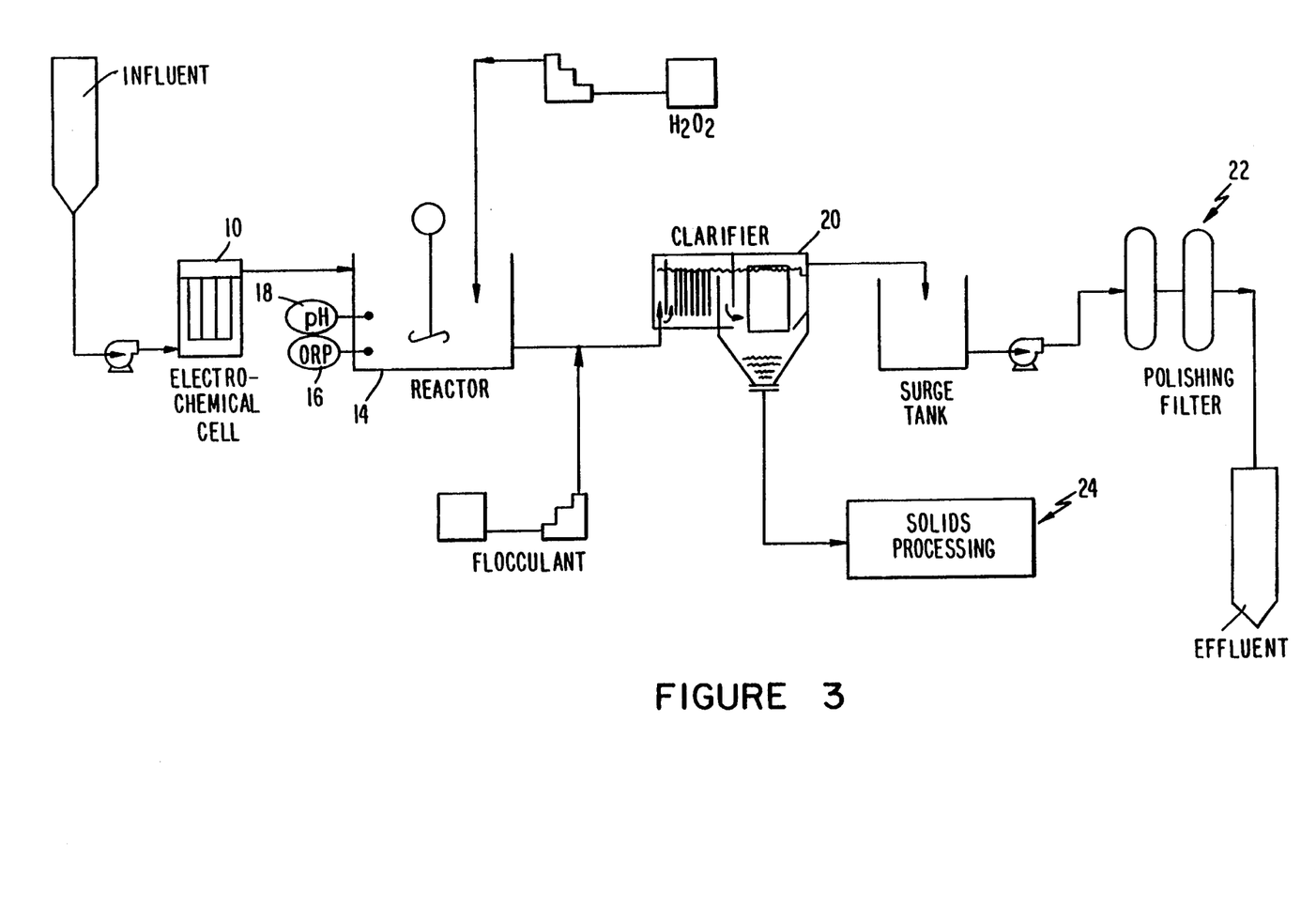
FIG. 3 is a schematic representation of the apparatus for the process of this invention.

With attention to FIG. 3, while this invention is not intended to be limited to the type of cell, it is preferred to use the electrolytic cell described and claimed in the above-identified patents which are assigned to the assignee of this invention. The cell consists of a housing of an inert material such as polyvinylchloride with a plurality of electrode plates closely space therein. The anode is composed of, or at least covered with, iron and may be of hot or cold rolled steel, stainless steel, another iron alloy, or an insoluble iron compound such as ferrous oxide or magnetite. The cathode preferably also is of iron but may be of any other suitable electrolytic material compatible with the anode and electrolyte. An electric potential will be applied to an anode plate and a cathode plate and, preferably, a plurality of iron plates will be disposed between the anode and cathode in mutually spaced relationship.

The process of this invention is intended to be carried out at a pH of between 4 and 11 and preferably at room temperature. In this pH range, as will be subsequently described, ferrous ion is generated at the anode and hydrogen gas and hydroxyl ions at the cathode with the hydrogen gas being vented to the ambient atmosphere.

In the use of cold and hot rolled steel anodes, a problem was encountered in commercial scale systems in the formation of adherent hydrous oxide gelatinous precipitates which can lead to blocking of flow channels in the cell, especially the passage between closely spaced, stacked electrode plates. Another problem encountered was the formation of an insoluble insulating iron oxide layer on the electrode surface, often underneath the gelatinous precipitants which can give rise to high overvoltages and generation of oxygen at the anode. In U.S. Pat. No. 4,123,339, this problem is solved by a periodic wash with a dilute inorganic acid and it is intended that continuous operation of the process of this invention would also include the periodic acid wash of the electrode plates described therein.

In addition, the use of closely generally parallel plate electrodes including end electrodes to which the electrical potential is applied an electrode near at least one end electrode is positioned to protect the end electrode from the flux field effects which would cause a more rapid consumption of the electrode. This feature is also described in U.S. Pat. No. 4,036,726, and that feature is preferred in the cell of this invention.

It is preferable then to utilize the electrochemical cell to generate ferrous hydroxide directly from steel electrodes. Other anions in solution such as sulfate, chloride, and nitrate can hinder treatment by directly occupying adsorption sites or orienting around oppositely charged cites, thus preventing arsenate adsorption. By suppressing adsorption, this inhibition type prevents complete removal and shifts the adsorption edge. It is then an essential feature of the process of this invention that the ferrous ions be added to solution without adding any inhibitory anions such as sulfate or chloride.

In the system of this invention, process water is first pumped through the electrochemical cell which is maintained in a pH range of 4 to 11. The wastewater flows through the gaps in contact with the electrodes while a DC power supply is connected between the cells two end electrodes. As current flows from electrode to electrode through the process water, an electrochemical reaction occurs where the positive charged sides, the anodes, of the electrodes, give off ferrous ions. Iron addition is controlled simply by varying the cell power. At the negative sides, the cathodes, water breaks down into hydrogen gas and hydroxyl ions. The overall reaction results in the formation of ferrous hydroxide. As the ferrous hydroxide is generated, the electrodes are slowly consumed. After exiting the electrochemical cell, the process water flows into a reaction tank 14. In tank 14, hydrogen peroxide is added based either upon a signal from an oxidation reduction potential probe 16, as determined by a preliminary analysis, to oxidize the arsenic and ferrous ion present. Oxidation then occurs in reactor 14 converting the ferrous ion to ferric and the arsenite state to the arsenate state. The reactor tank has a pH probe 18, typically, and a controller (not shown). Before entering the clarifier, a small amount of polymer flocculent is added to improve the settling properties of the precipitated solids. Newly formed solids settle to the bottom of the clarifier while the overflow flows to a polishing filter 22 before exiting the system. Settled solids are typically sent to a plate and frame type filter press 24 for dewatering. Content of the filter press cake will consist of ferric hydroxide, arsenic, and other suspended solids or precipitated metals removed by the process. Of the two treatment chemicals, iron hydroxide and hydrogen peroxide, the iron hydroxide is removed in the form of sludge and unreacted hydrogen peroxide breaks down into water and oxygen.

EXAMPLE

With reference to Table II below, the results therein were obtained from bench scale tests performed on groundwater from a pesticide/herbicide manufacturing plant. The results show that along with arsenic, other metals such as chromium, copper, manganese and zinc, can be removed by electrochemical iron addition, hydrogen peroxide oxidation, pH adjustment, polymer assisted clarification and filtration. In order to achieve low residual metals concentrations, certain chemical conditions must exist. The process is well suited for simultaneous removal of chromium and manganese. As ferrous iron is generated, it reacts with the hexavalent chrome reducing it to less toxic, more insoluble trivalent form. Oxidation of ferrous ion to ferric occurs concurrently. The hydrogen peroxide addition step along with oxidizing the unreacted iron and arsenic also oxidizes manganese from the $Mn^{+2}$ to $Mn^{+4}$ state. The result is the formation of insoluble manganese dioxide which improves the removal efficiency.

TABLE II

TREATMENT RESULTS FOR PESTICIDE/HERBICIDE PLANT GROUNDWATER

|  | INFLUENT | TREATMENT 1 | TREATMENT 2 |
|---|---|---|---|
| $Fe^{+2}$ ADDED ppm | — | 25 | 50 |
| $H_2O_2$ ADDED ppm | — | 8 | 15 |
| FINAL pH | — | 7.21 | 7.19 |
|  | INFLUENT ppb | RESIDUAL ppb | RESIDUAL ppb |
| Arsenic | 1100 | <5* | <5* |
| Chromium | 44 | <10* | <10* |
| Copper | 1500 | 21 | <20* |
| Manganese | 1100 | 22 | <10* |
| Zinc | 2100 | 14 | <10* |

*Less than Detection Limit

Table III below contains the results from several treatability studies. Detection limits vary depending upon discharge limits. For two studies, the treated sample was not below detection limits. However, in both cases, over 99% removal was achieved. All constituents of individual water samples must be considered when designing a treatment system. To optimize treatment, competing and complexing species must either be removed or rendered ineffective and pH must be carefully controlled. Although it appears that a treatment level in the range of 10:1 iron to arsenic ratio is required for good removal, this is not necessarily the case. A 5:1 weight ratio coupled with a final pH of around 6.5, effectively reduces residual arsenic concentrations to near or below detection limits. While the optimal final pH was chosen based n extensive lab work, it is interesting to note that it agrees well with the theoretical adsorption curve found in FIG. 1. When arsenic concentrations are starting at less than 5 ppm, 25 parts per million iron is added and yields an excellent, coarse, fast settling hydrous ferric oxide floc. Lower iron addition levels decrease the floc quality and settling characteristics. If an effluent pH above 6.5 is required, due to local limits or for the simultaneous precipitation of other metals that prefer higher precipitation pHs, the iron dosage can be increased to counter the deviation from the ideal pH range as shown in FIG. 2.

TABLE III

TREATMENT RESULTS FOR VARIOUS INDUSTRIES

|  | Initial Arsenic ppb | $Fe^{+2}$ ADDED ppm | TREATED ARSENIC ppb |
|---|---|---|---|
| 1. Calcium Arsenide Semiconductor Process Wastewater | 5200 | 50 | 45 |
| 2. Groundwater from Paint Manufacturing Site | 21,000 | 200 | 120 |
| 3. Pesticide/Herbicide Manufacturing Site Groundwater/Surface Water | 63,000 | 300 | <5* |
| 4. Chemical Production Plan Process Water | 2020 | 25 | <50* |
| 5. Mine Drainage | 82 | 25 | <1* |

*Less than Detection Limit

The system shown in FIG. 3 was utilized at a Superfund Site. The influent conditions for the surface water at the site are provided in Table IV below. Based on the influent concentrations, iron and hydrogen peroxide addition dosages were calculated. Samples were collected at various stages of the tests and analyzed for metals of concern. The samples were split and sent to two different laboratories. Two labs were chosen in order to verify results. The results show that after the clarifier and polishing filter, the metals were removed to well below permitted levels.

As a result of the test, 100 grams of filter cake was collected and sent to a contract laboratory in order to perform a TCLP analysis. The TCLP test is a test which measures leachable metals found in the filter cake. If the leachable metals are below prescribed permissible concentrations, then the filter cake is deemed nonhazardous and allowed to be sent to a nonhazardous landfill for disposal. The results of the TCLP test are shown in Table V below. As can be seen, the filter cake passed the TCLP test. The test shows how tightly the contaminants are bound in the electrochemically generated iron matrix. Also, these results indicate that arsenic removal is occurring via the proposed precipitation/complexation mechanisms. This is a distinct advantage of the electrochemical process over other types of precipitation processes.

TABLE IV

SURFACE/STORMWATER TREATMENT AT SUPERFUND SITE

| METAL | INFLUENT, ppb | EFFLUENT, ppb | DET. LIMIT, ppb |
|---|---|---|---|
| Hg | 0.24 | ND | 0.2 |
| As | 56,000 | 95 | 50 |
| Ba | NM | NM | NM |
| Cd | 260 | ND | 5 |
| Cr | 720 | ND | 10 |
| Pb | 240 | ND | 5 |
| Se | 16,000 | ND | 25 |
| Ag | ND | ND | 10 |
| Cu | 56 | ND | 10 |

ND = Not Detected
NM = Not Measured

TABLE V

RESULTS OF TCLP ANALYSIS

| METAL | TCLP RESULTS, mg/l | DET. LIMIT, mg/l |
|---|---|---|
| Hg | ND | 0.02 |
| As | ND | 0.5 |
| Ba | ND | 5.0 |
| Cd | ND | 0.1 |
| Cr | ND | 0.5 |
| Pb | ND | 0.5 |
| Se | ND | 0.5 |
| Ag | ND | 0.5 |
| Cu | ND | NM |

ND = Not Detected
NM = Not Measured

Other pilot plant tests were performed for wood preservation operations in the western United States. The process utilized was the same as shown in the schematic of FIG. 3. At this facility, the main contaminants of concern were chrome, copper and arsenic which are a result of a CCA process employed at the site. The groundwater showed influent concentrations several times that of drinking water standards. After treatment, the effluent concentrations were 0.005 mg/l for hexavalent chrome, 0.010 mg/l for total chrome, and less than 0.010 mg/l for arsenic.

In summary, it has been discovered that utilization of electrochemically generated ferrous ion without inhibitory anions and a subsequent oxidation step can remove soluble arsenic compounds from wastewater and groundwater to a level acceptable as meeting drinking water standards. In addition, heavy metal contaminants present in such wastewater will also be removed as an insoluble flocculent precipitant. It is necessary, according to the process of this invention, to use an excess of iron over the contaminants to be removed and preferably an excess of iron over arsenic of 4 to 5:1 when clarification is achieved at a neutral pH of about 6.5. As the pH is increased in order to precipitate in addition to arsenic other heavy metals, the iron excess will also be increased.

The result is the highly efficient process for removal of arsenic and other contaminants from aqueous media.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. Process for removing arsenic from aqueous media comprising the steps of:

providing a bipolar electrochemical cell comprising a pair of outer electrode elements, respectively, an anode and a cathode, positioned in parallel, spaced apart relationship and a plurality of additional electrode elements disposed between said outer electrode elements in a closely spaced relationship therewith, said additional electrode elements being substantially equidistantly spaced one from another and disposed parallel to said outer electrode elements;

passing said media through said cell while applying an electric potential across said electrodes so that said anode and cathode are oppositely charged, respectively, positive and negative, and said additional electrodes are charged by induction to produce a positively charged portion and a negatively charged portion on each electrode, said anode element and said positively charged portion of each additional electrode having a surface or a portion of a surface of iron, iron alloy or insoluble iron compounds so as to produce anodically ferrous ion in the form of an insoluble iron compound, specie, or complex in said ionizing media;

subjecting said media containing said iron compound, specie, or complex to a mild oxidation sufficient to convert the ferrous ion present therein to ferric ion and to oxidize the arsenic therein to the +5 valance specie to form ferric arsenate and an hydroxy ferric oxide-arsenate complex which compound and complex are insoluble in said aqueous media; and removing said insoluble compound and complex from said media.

2. The process of claim 1 wherein said oxidation is achieved by adding a set quantity of hydrogen peroxide to said media.

3. The process of claim 2 wherein the hydrogen peroxide added is a set quantity at least sufficient to oxidize the ferrous and arsenic species to, respectively, +3 and +5 valance states.

4. The process of claim 3 wherein said insoluble compound and complex are removed from solution at a pH of about 6.5.

5. The process of claim 1 wherein the ferrous ion generated in said cell is generated in a ratio of at least 4 to 5:1 over the arsenic present in said media.

6. The process of claim 1 wherein said media further contains manganese ion at a +2 valance state and said oxidation oxidizes said ion to a +4 valance state to form an insoluble manganese hydroxide.

7. The process of claim 1 wherein said media further contains hexavalent chromium ions which are reduced by the ferrous ion produced in said cell to form an insoluble chromic hydroxide or complex with the ferric ion produced when said ferrous ion reduces said hexavalent chrome to a +3 valance state.

* * * * *

UNITED STATES PATENT AND TRADEMARK OFFICE
CERTIFICATE OF CORRECTION

PATENT NO. : 5,368,703
DATED : November 29, 1994
INVENTOR(S) : Michael D. BREWSTER It is certified that error appears in the above-indentified patent and that said Letters Patent is hereby corrected as shown below:

```
In column 3, line 7, change "affluent" to --effluent--.
In column 6, line 1, change "space" to --spaced--.
In column 8, line 6, change "n" to --on--.
```

Signed and Sealed this

Twenty-third Day of May, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,368,703
DATED : November 29, 1994
INVENTOR(S) : Michael D. Brewster It is certified that error appears in the above-indentified patent and that said Letters Patent is hereby corrected as shown below:

Title page, item [73], assignee: should read --Andco Environmental Processes, Inc., Amherst, N.Y.--.

Signed and Sealed this

First Day of August, 1995

Attest:

BRUCE LEHMAN

Attesting Officer

Commissioner of Patents and Trademarks